(No Model.)

C. L. BUTLER.
VISE.

No. 253,581. Patented Feb. 14, 1882.

Witnesses:
Jeremy Waine
J. N. Kalb

Inventor:
Calvin L. Butler
per Edw. W. Donn & Co.
Attys.

UNITED STATES PATENT OFFICE.

CALVIN L. BUTLER, OF GREENFIELD, MASSACHUSETTS.

VISE.

SPECIFICATION forming part of Letters Patent No. 253,581, dated February 14, 1882.

Application filed December 22, 1881. (No model.)

*To all whom it may concern:*

Be it known that I, CALVIN L. BUTLER, of Greenfield, in the county of Franklin and State of Massachusetts, have invented certain new and useful Improvements in Vises; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention is an improvement in vises.

It consists of a vise having jaws which are movable toward or from each other by means of a differential screw provided with threads of unequal pitch, said jaws being guided in their movement by a bar fixed to one of said jaws and movable in a stock and the shank of the opposite jaw, all of which will be fully set forth hereinafter.

Figure 1:
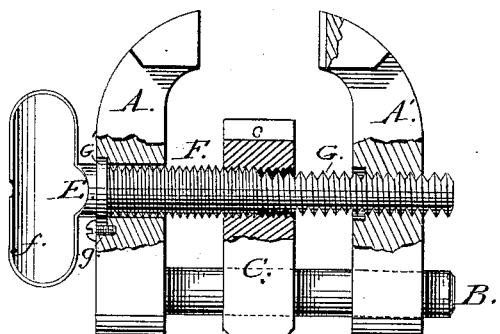
Figure 2:
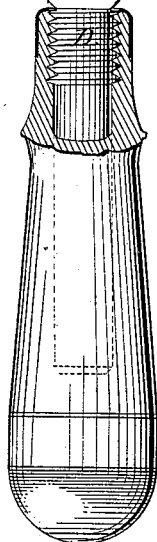
Figure 2:
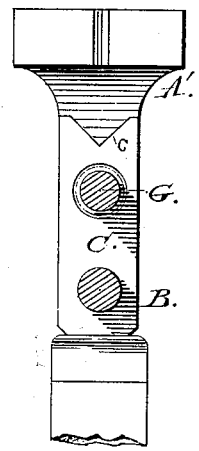

In my drawings, Figure 1 is an elevation of my vise. Fig. 2 is a sectional view of the same.

Similar reference-letters indicate like parts in all of the figures.

Referring to the drawings, A A' are the jaws of the vise, of the usual form. One of said jaws— *i. e.*, A'—is provided with a screw-threaded opening adapted to receive a coarse screw, and also a smooth opening to receive a sliding bar, B. The other jaw, A, has extending from it the bar B, and is pierced with a smooth opening adapted to receive the screw which passes through and unites the two jaws.

C is the stock, provided with a smooth opening to receive the bar B and allow it to pass freely through it. This stock has also a screw-threaded opening to receive and engage with a portion of the operating-screw. On the upper end of this stock is formed a V-shaped notch, *c*, intended to assist in holding steadily the end of a tool held by the vise, and its other end may be finished with a shank screw-threaded at D to form a hold in a work-bench or any convenient attaching place.

E is the differential screw, formed in the main of two screw-threaded portions, F and G, the former of which is of given diameter and threaded with fine threads to give a slow movement toward that with which it engages. The part G of said screw is of smaller diameter and threaded with coarser threads to give to the jaw A' a movement of greater rapidity than would be given by the movement of the part F. The screw E has a thumb-hold, *f*, and an annular ring, G', the latter adapted to fit snugly into a corresponding annular rabbet in the jaw A. The screw E is held in place in the jaw A by means of a simple screw, *g*, which is driven into said jaw sufficiently far to bring its head slightly bearing on the outer vertical wall of said annular ring, allowing, however, a free movement of said screw E within the jaw A. The face of jaw A is provided with a V-groove formed vertically at right angles to the axis of the screw E, and in line with the same, to give a biting hold onto the tool within the grasp of the vise.

In operating my vise the screw E is turned from the thumb-hold *f* to the right or left to cause the jaws to approach toward or recede from each other. In the drawings the threaded portion F of the screw is one-half the pitch of the part G. Consequently the tendency of the movement of the former is to carry the jaw A toward the stock and the jaw A' away from it at a given speed at the same time that the portion G of the screw E draws the jaw A' toward the stock twice as fast as said jaw is moved in the opposite direction. The result of these two opposite forces is to cause the two jaws to approach each other and the stock at an equal and uniform speed, so that the faces of the jaws will meet each other, if nothing is interposed, exactly at the axial line of said stock, being guided the while by the bar B. An opposite motion of the screw E obviously will give an exact opposite or reverse result.

The screw E might be formed of different relative proportions as to diameter and pitch— as, for instance, instead of two to one the threads might be three to one—in which case the jaw A' would pass the axial line of the stock before the face A would be reached.

I do not wish to confine myself to a differential screw having its screw-threaded parts of the exact relative pitch as shown; but

What I claim as new, and desire to secure by Letters Patent, is—

1. A vise composed of the stock C, the jaws A' A, and a differential screw operating the same, as and for the purpose specified.

2. The differential screw E, in combination with the jaws A A', the stock C, and guide-bar B, as and for the purpose set forth.

In testimony that I claim the foregoing as my own I affix my signature in presence of two witnesses.

CALVIN L. BUTLER.

Witnesses:
ELLA C. WILLIAMS,
GRACE D. WILLIAMS.